US006527193B1

(12) United States Patent
Béli et al.

(10) Patent No.: US 6,527,193 B1
(45) Date of Patent: Mar. 4, 2003

(54) TRACKING METALLIC OBJECTS BY INFORMATION INCORPORATED THEREIN

(75) Inventors: János Béli, Dunakeszi (HU); Róbert Keszte, Budapest (HU); Peter Molnar, Budapest (HU); Gyorgy Posgay, Budapest (HU); Alfonz Szamos, Budapest (HU); János Takács, Budapest (HU)

(73) Assignee: Magyar Allamvasutak Reszvenytarsaag, Budapest (HU)

( * ) Notice: Subject to any disclaimer, the term of this patent is extended or adjusted under 35 U.S.C. 154(b) by 0 days.

(21) Appl. No.: 09/463,608

(22) PCT Filed: Jul. 28, 1998

(86) PCT No.: PCT/HU98/00073
§ 371 (c)(1),
(2), (4) Date: Mar. 30, 2000

(87) PCT Pub. No.: WO99/05636
PCT Pub. Date: Feb. 4, 1999

(30) Foreign Application Priority Data

Jul. 28, 1997 (HU) .............................................. 9701312

(51) Int. Cl.[7] .............................................. G06K 19/06
(52) U.S. Cl. ...................................... 235/493; 235/449
(58) Field of Search ................................. 235/449, 450, 235/468, 493, 494

(56) References Cited

U.S. PATENT DOCUMENTS

| | | | | |
|---|---|---|---|---|
| 4,242,789 A | * | 1/1981 | Fox | 235/493 |
| 4,467,172 A | * | 8/1984 | Ehrenwald et al. | 219/121.68 |
| 5,168,477 A | * | 12/1992 | Schenato et al. | 367/87 |
| 5,206,496 A | * | 4/1993 | Clement et al. | 219/121.6 |
| 5,369,273 A | * | 11/1994 | Fisun et al. | 250/271 |
| 5,773,811 A | * | 6/1998 | Schramm et al. | 235/462.25 |
| 6,068,966 A | * | 5/2000 | Koga | 219/121.85 |
| 6,355,361 B1 | * | 3/2002 | Ueno et al. | 324/200 |

* cited by examiner

*Primary Examiner*—Mark Tremblay
(74) *Attorney, Agent, or Firm*—Young & Thompson

(57) ABSTRACT

The subject of the invention is method and device system for entering and retrieving information in the surface layer of objects made of solid matters. The information is entered with a (concentrated) beam directed to the surface and having a power density selected to induce permanent change at least in the surface layer of the material's structure in a way that the power density of the beam is smaller that the power density of the beam causing visible deformation, but bigger than that of the beam that causes (within the order of magnitude of the beam's diameter) inhomogeneities commensurable with the structural inhomogeneities generally present in the material. The invention can be used for all materials, the structure or internal stress of which can be modified with high energy density surface treatment (at the location of the treatment) (specially with the local laser treatment of ferromagnetic material).

20 Claims, 6 Drawing Sheets

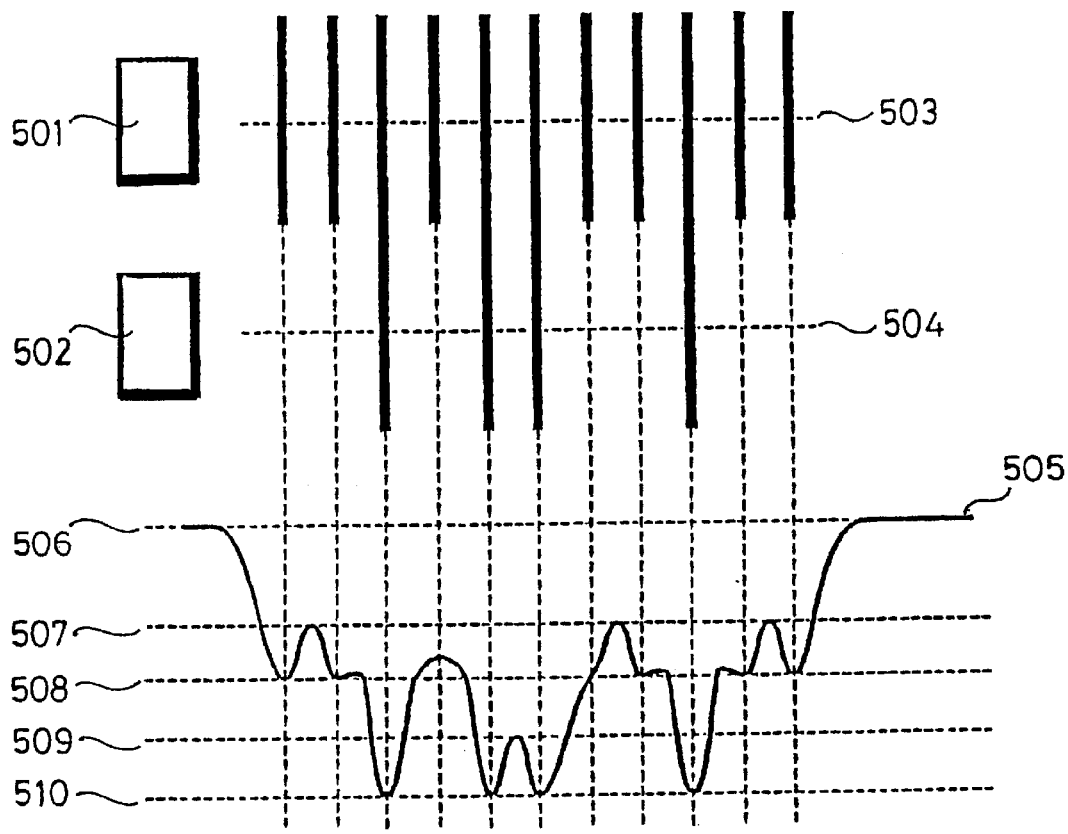
Fig. 5
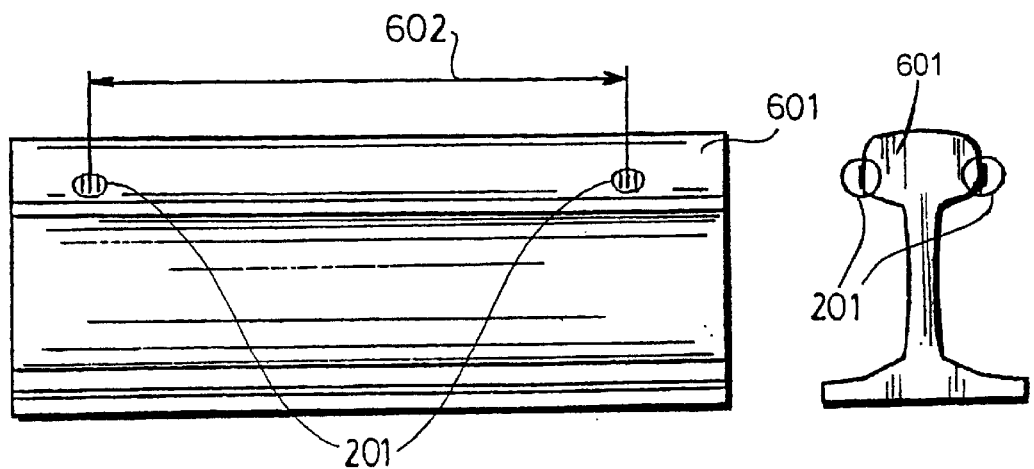
Fig. 6a
Fig. 6b

TRACKING METALLIC OBJECTS BY INFORMATION INCORPORATED THEREIN

THE FIELD OF THE INVENTION

The subject of the invention is a process for the complex preparation of markings or marking systems, through the modification of the structure or internal stress within materials, and for the non destructive reading of these markings or marking sets. It provides a complex system for marking and the reading of the markings, thus it is a process on the one hand, and an equipment system on the other hand, to produce marks, marking through the modification of the structure (texture), or local stress in the layer near the surface of materials by high energy density (HED) surface treatment, respectively. In the course of the process the information is applied with the help of a beam targeted (concentrated) to the surface, with the power density adjusted to a level ensuring irreversible change at least in the structure of the surface layer of the material. The markings can be read in a non-destructive and contactless manner through the measurement of electric, or acoustic characteristics and the information contents (coded) or position (localisation) of the markings can be determined with the aid of special electronics or measuring system.

WO-A-94/11146 discloses a system for tracking metallic objects by the application and subsequent reading and comparison of information incorporated therein with stored data, the system comprising a device for applying information to an object along a prescribed pattern, storing devices and a device for reading the information from the marked object. The markings are produced by transferring heat energy along the prescribed pattern using a laser permanently changing the surface layer of the object to a prescribed depth. The information reading device contains an energizing device energizing the surface layer of the marked object with light and an optical detecting unit for detecting a response signal invoked at the marked object by said energizing light and a unit for restoring information from deviations caused by local unevenness of said response signal. These markings are often suitable and the users achieve their purpose by using them but in several cases are not adequate as they can be easily falsified.

DISCLOSURE OF THE INVENTION

In many cases it may be important for the information not easily readable—that is the information should be concealed. In other cases the traditional visual (optical) reading can not be used reliably due to the environmental conditions (e.g. pollution, corrosion). The aim of the invention is to develop a system for the tracking metallic objects by applying and subsequently reading of marks, markings incorporated into or bound to said objects and comparison of read information with recorded data, which system comprises a marking device applying information to the object through a prescribed pattern, record keeping devices and a device for reading the information from the marked object.

The process provides furthermore information about different methods of applying markings carrying information, discloses methods for reading instruments applicable therefor as defined in the appended claims.

BRIEF DESCRIPTION OF THE PROCESS

The preparation of marks, markings or marking sets of known characteristics through high energy density surface treatment (e.g. laser) of the near surface layers of materials. The markings carry analogue or digital information that can help identification, are coded (e.g. indicating serial number with barcode), or determine geometric place (e.g. distance units of length measurement). The markings can be invisible (e.g covered by paint, embedded in plastic or paper, or can even be under corroded surfaces). The markings can be read with or without any air gap, with stationary or moving reading head. The coded information of the markings can be decoded with the aid of a special electronic device. The prescribed spacing can be determined with a special measuring instrument.

The present application offers methods suitable to solve these tasks in a sophisticated manner and compiled into systems.

In the cases explained in the application the information is provided by the remanent modification of the material structure caused in the near surface layer, and through the readability of its discernible magnetic, electric or acoustic characteristics. It is expedient to use structural changes that can be measured (read) in a scanning mode and without the destruction or significant weakening of the signal even through a coating (paint, corrosion) without any contact in a non-destructive manner. The structural change can be different for different materials (e.g. for steel change in the texture, residual stress state and thus in the magnetic structure is also suitable).

Principle (Physical and Tectonical) of Making and Reading Signals

With the local changes in the structure and/or residual stress state in the near surface layer of the material, the magnetic, electric and acoustic properties also exhibit a local deviation, respectively.

With the introduction (or removal) of local heat energy as a result of the changes caused by it, (residual under the conditions of application), local material creep (plastic deformation), local residual stress changes can be induced in all solid materials.

If the solid matter can exist in different structural states (phases, grain, allotropic form), by applying the treatment with the required energy density it is possible to induce local structural changes.

It is well known, that magnetic electric properties like permeability, coercitive force, etc. of magnetizable materials depend on the structure of the material and the stress.

Thus, for magnetizable materials the local change of the stress will result in the local change of magnetic properties.

For instance, for low carbon steels (0.1%) the Barkhausen noise (BN) in the stress state near the flow limit can be the multiple of that measured in stress free state.

In magnetizable materials the locally modified material structure (or in non-magnetizable materials the locally modified magnetic material structure) will result in locally changing magnetic properties.

Example for structural steels (0.2–0.8 C%), it is possible to induce zoned, martensitic transformation through a surface heat treatment carried out by a laser with high enough power density and caused by the high speed internal heat conduction ensured by the material itself. The magnetic Barkhausen noise measured under the same conditions on the zone of martensitic transformation is only a fraction of that of the base material, thus the geometric location and size of the annealed zone is easily detectable on the basis of Barkhausen noise measurement.

Example: As a result of local treatment, ferromagnetic changes occur in the corrosion resistant austenitic steel which (clearly) results in measurable magnetic Barkhausen noise value.

It follows from the above, that with the measurement of magnetic properties it is possible to arrive at deductive conclusions about the stress state and its changes, on the basis of which the place and certain characteristics of the treatment can be determined.

Local changes in the material structure, attained through a treatment carried out with enough power density will induce local changes in the electric conductivity of conductive materials, allowing thus the place and certain characteristics of the treatment to be determined.

Changes in the texture and mechanical stress causes changes in the acoustic characteristics (velocity, decrease).

Preparation of Markings (In Base Material, Semi Finished and Finished Products)

Markings can be prepared characteristically with high energy density (HED) processes. These include processing by laser, plasma, ion, electron and focused light beam (depending on the desired geometric characteristics and material), but any other method can be contemplated which can produce local structural changes trough its power density causing intensive heating or cooling.

BRIEF DESCRIPTION OF THE DRAWINGS

The invention, its further features, advantages, embodiments, means are disclosed in details by referring to the attached drawings and non-limiting examples, respectively. In the drawings:

FIG. 5 shows a bar system consisting of control bars and data bars, readable using two independent measuring channels and the signal distribution produced from the collated signals.

FIG. 6 shows a possible arrangement for the measurement of distance in railway track rail.

DETAILED DESCRIPTION OF THE PREFERRED EMBODIMENTS

In the course of describing the invention examples are given on the basis of which and taking into account also the knowledge of the relevant field a person having skill in the art will be able to put the invention to practical use.

Heat transfer systems with high energy densities can be advantageously used for realizing different embodiments of the invention. These include beams, selectively directed and focused by suitable elements (to a well defined size), of different radiation, especially light, which are generally used for the processing of metals (cutting, smelting, annealing) through heat treatment. Heat transfer can also be carried out by way of heat removal, local cooling, for instance by establishing a heat-bridge or by directing concentrated jet of cooling medium onto the surface. Characteristic data of the power density (P) and effective diameter (d) of high energy density processing technology:

| laser: | $P = 10^3 - 10^8$ W/mm$^2$ | $d = 10^{-3}$ 1 10$^0$ mm |
| electron beam: | $P = 10^3 - 10^7$ W/mm$^2$ | $d = 10^{-3}$ 1 10$^0$ mm |
| plasm arc: | $P = 10^3 - 10^4$ W/mm$^2$ | $d = 10^0$ 1 10$^1$ mm |

In the case of high energy density (e.g. laser) surface treatment, as a result of the high energy density of the focused beam arriving to the surface, the surface gets heated at a rate of about $10^7$ K/s to a temperature above the transformation temperature characteristic to the material (but depending on the type of surface treatment may even melt). Due to the relative movement between the beam and the treated workpiece and indicated by the arrow 303 (FIG. 1) the heat input relating to a point of the workpiece ceases after the fast temperature rise. As the temperature rise affects a very small volume in the order of magnitude of the focused beam 101, after the termination of the heat input the surrounding large volume base material removes the heat immediately from, the place of the treatment, causing thereby a cooling rate almost identical of that of the heating. It is a characteristic feature of crystalline materials that the structure of their texture changes when cooling from temperatures above their transformation temperature which leads to changes in the lattice structure and thus, to the change of the internal stress state.

Figure 2:
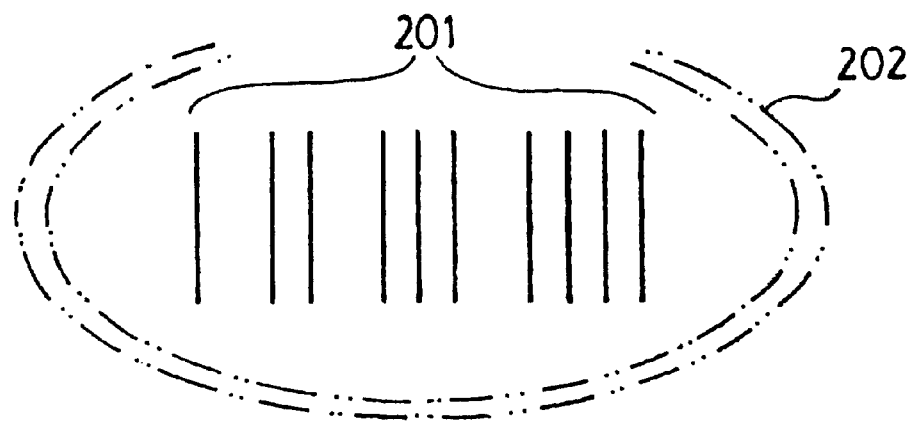
FIG. 2 shows the schematic design of a possible set of markings where the ellipses formed around the set of markings limit stress peaks (potentially damaging to the structure).

In case of spot like heat input the part of the workpiece not being heated can be considered as a semi infinite space, thus heat removal occurs in the same amount in all directions of the half-space. The result is an annealed zone theoretically with a half circle cross section, considered marking 102. The prescribed set of 102 markings is called a marking group 201. FIG. 2.)

The local internal stress fields caused by the annealed zones should be protected against effects breaking down or weakening the stress with suitable designs, while at the same time the structure must be protected against eventual harmful stress concentration caused by the annealed zones. One method is to delimit the 102 marking or 201 marking group from the surroundings from the point of view of stress by placing them within a closed stress delimiting annealed 202 curve. The ellipses around marking group 201 in FIG. 2 demonstrate this solution.

The technological data of laser (or other, e.g electron) beam marking depend on a large number of parameters. Typically, those are determined in preliminary technological experiments corresponding to the use.

The effect of the laser surface treatment is greatly influenced by the beam absorbing capacity of the surface and the wavelength of the laser. (The wavelength of the laser used for the treatment can be chosen from the available selection). By increasing the absorption at a given wavelength, identical laser power will transform larger volumes, or in the opposite case, reduced laser power can achieve markings with the same depth.

E.g. the data of laser technology (beam power, the size of the illuminated spot, the relative movement speed of the beam, etc.) are affected by the properties of the materials, quality (composition, surface roughness, beam absorbing capacity, etc.), the quality of the laser beam (wavelength, modus structure, etc.). Depending on the practical preparation of the markings, it is possible to determine the type of change that should take place (e.g. whether melting is allowed or only a texture change, or whether residual stress change should occur from the treatment). The endurance of the markings in time depends on the method by which they are prepared (e.g. part of the residual stress could build down with time).

The cross section of the markings perpendicular to the direction of line drawing should resemble as much as possible a semicircular form to increase reliability.

E.g. the shape of the markings (depth)
- from the aspect of corrosion resistance (railway track rails) the markings should be placed as deep as possible, the distance of the marking sets must be formed at known (e.g. 20° C.) temperature to given (e.g. 840 mm) distance,
- in the case of markings used to number sheets of car frames the markings must be durable but prepared in a manner that does not damage the surface quality, and should be prepared during the phase of pre-manufacturing because in that case the markings can be utilized in the subsequent manufacturing phases, in production management, material handling or quality assurance, respectively. Depending on the stage of production where the process is inserted into the manu-facturing process the markings can be applied: before cold-pressing onto flat sheets less subject to stress during subsequent processing, or after cold-pressing at locations less exposed to loads (neutral stress field).

Preparation of the Markings During Manufacturing

Markings can be prepared not only subsequently in the carrier material, but also during its fabrication. In this case the marking is prepared not by local energy input but by local energy removal, local cooling (e.g. with liquid jet spray), respectively.

For instance during casting, as a result of an increased heat removal globular graphite structure will develop instead of plate graphite structure. Local heat removal can be achieved through heat bridges built into the casting mould at appropriate places of the cast product, e.g. at a so-called projection.

With certain limitations it is possible to apply selective heat removal during hot rolling too, which helps the marking of rolled products.

In the production of metal-glass ribbons by fast cooling the cooling drum is prepared with selectively differing cooling properties by building in segments of different heat transport properties.

Markings Produced by Using a Marking Carrier Material Incorporated into the Material to be Marked Composite materials are used in many areas of industrial production. The marking and reading system subject of the present application would be impossible or difficult to use in all of the material or its major volume component, while it is possible that the composite material has a component (e.g. certain types of fiber reinforcement) the method could be applied on. The markings can be prepared on the suitable component; of the composite prior to incorporating, or under certain circumstances after building into the composite. Examples are metal filament reinforced plastics, textiles, metal filament papers. If there is a need for marking, a component suitable for marking can be incorporated into the composite intentionally (e.g. paper bank notes with metal filaments suitable for marking)

This method can be used for biologic materials as well by applying the same principle.

The Preparation of Marking Groups from Markings

Depending on the circumstances of the use the arrangement of markings 102 into marking groups 201 can be carried out in different ways.

Applying so-called control bars 503 (see FIG. 5) facilitates reading of stored information. This control bar 503 ensures that on the course of manually moving the probe unstable speed of the probe does not result in erroneous readings, i.e. loss of signal.

FIG. 5 shows a possible embodiment therefor.

The bar system shown on FIG. 5 consisting of control bars and data bars can be applied along with the use of two independent measuring channels. The first probe 501 measures control bars 505 consisting of markings 102 placed in accordance with the spacing corresponding to the data bar, the second probe 502 measures the data bars 504. The voltage distribution 505 on the figure is obtained by adding the voltages induced in probes 501 and 502. FIG. 5 shows the voltage levels on the basis of which the original information can be restored as 506—without data and control bar, 507—between two control bars, 508—on control bar, 509—between two data and control bars, 510—on the data and control bar.

The existence or non existence of the data bar yes/no, 1/0) can be determined on the basis of the signal measured at the control bar, if there is control bar, but there is no data bar then the information is 0, if there is control bar, and there is data bar, then the information is 1.

In order to carry out one dimension geometric measurements (along a straight-line) markings 102, marking groups 20 consisting of two or more marks placed perpendicularly to the direction of a distance 602 to be measured can be used.

With the traditional barcode system finding and reading marking groups 201 is direction dependent, that is readability becomes worse with the angle error if the angle defined by the orientation of the bars and the direction of displacement differs from 90°.

If the markings 102 are arranged as radial bars around a center with a predetermined angular spacing (see FIG. 8) and the reading is carried out with a rotating probe, then approaching the marking group 201 from any direction after sensing any of its elements proper alignment can be ensured.

After sensing all markings, the centralized alignment is ensured on the basis of the identical spacing of the 503 control bar sensing, which is the condition of geometric measurement, and the coded information can be read as well.

Plane, multi-axis measurements can be carried out with a marking group 201 containing at least two markings 102. A preferred arrangement is demonstrated in FIG. 8.

Figure 8:
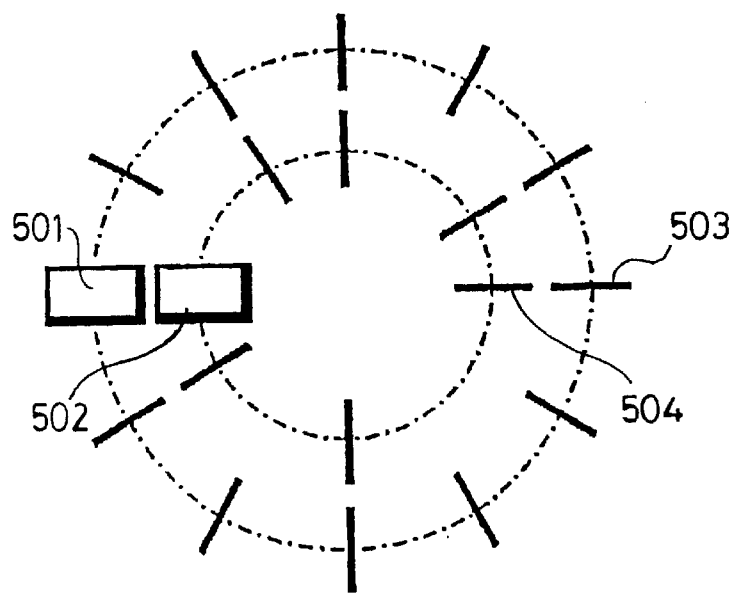
FIG. 8 shows preparation of a set of markings with radially placed control bars and data bars, and a rotating dual magnetic head for appropriate reading.

In this case reading of the marking is carried out not by a probe moving along a line but by a rotating probe and the marking group arranged as shown in FIG. 8 can be read by probes 501 and 502 moving on the prescribed radius of rotation. The restoration of the information from the sum of the voltages measured in the two probes is identical to that described on the basis of FIG. 5. Approaching the marking group with the measuring head probe 501 moving along a larger radius intersects the control bars and helps the alignment with the marking group. Exact alignment can be identified if the periodicity of the signals produced by the control bars is uniform. Probe 502 reads the information bars within the control bars.

Physical characteristics measured on marking group 201 in the function of the relative displacement 303 will provide electric voltage in the function of the relative displacement 303. The existence or non existence of this electric voltage or one of its characteristic values, e.g. the subsequent positions of the peak values or inflexions points can be assigned to the 102 marking, or the measurement result is a value derived from the arithmetic average of the points belonging to the half-values of the marking groups.

The Principle of Reading Marks (Marks and Markings)

All methods suitable to determine the place and magnitude of the structural change can be contemplated for reading the markings. From a practical aspect, the methods suitable for fast scanning reading can be used. These basically operate on the basis of the measurement of the changes in magnetic, electric and acoustic properties, respectively.

The most frequent methods used are: Barkhausen noise, stray flux, eddy currents, ultrasound.

The common feature of all these methods is that they are suitable to indicate changes in the local magnetic properties, conductivity or acoustic properties without direct contact in a scanning mode.

In the course of these methods and with the marking techniques indicated above structural changes have been made at prescribed places and with prescribed geometry. These structural changes cause changes in the magnetic, electric and acoustic properties, respectively, that can be measured with the aid of the methods listed above, consequently, it is possible to determine the geometry, location of markings, and from those the information contents too (even in case of optical invisible markings it is possible to reconstruct them with measurements).

Figure 7:
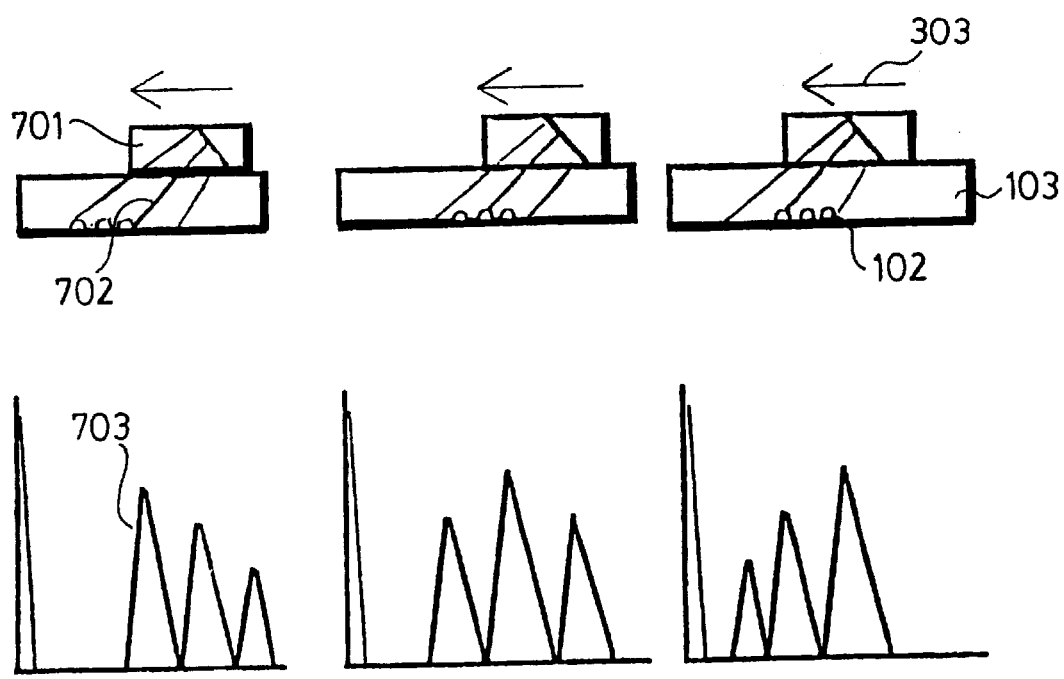
FIG. 7 recognition and determination of markings prepared by texture modification, with the aid of ultrasound.

Measuring Arrangement to Read the Place and Magnitude of the Changes in the Material Structure of Metals with Ultrasound Measurement Method FIG. 7 shows that the ultrasound reflected from the interface of the markings 102 made by way of texture changes and the base material 103 is suitable to recognize and determine the markings.

Ultrasound 702 is also suitable to indicate local structural changes (interface, boundary). The ultrasound 702 reflected from the interface between the markings 102 made by way of texture changes and the base material 103 can be separated from the boundary wall echo or other echo arriving from any other reflecting surface, response signal 703 on the basis of the different paths; hence the marking 102 is recognizable; its place can be determined with the aid of ultrasound generating and detecting probes 701.

Measuring Arrangement for Reading the Place and Magnitude of the Changes in Material structure and Near Surface Internal Stress in Magnetizable Material in a Contactless Manner Applying Barkhausen Noise Measurement Method It is well known that the properties (e.g. RMS value) of the so called magnetic Barkhausen noise generated during the magnetic reversal of magnetizable materials depend on the structure and stress condition of the examined material. [Pashley, R. L.,: Barkhausen effect—an indication of stress, Materials Evaluation, Vol. 28. No. 7. pp. 157–161, 1970].

It is well known that the change in residual stress state and material structure induced through annealing with laser can be detected by the measurement of the Barkhausen noise [Altpeter I., Meyendorf N.: Microscopic techniques for non-destructive characterization of materials structures and measurement of local residual stresses with high resolution, Proc. of 6th ECNDT, Nice, Tome 1, pp. 531–535, 1994].

It is well known that the measurement of magnetic Barkhausen noise can be carried out both in a stationary state or scan mode relative to the surface [Titto, S. I.: Barkhausen noise method for stress and defecting in hard steel U.S. Pat. No. 4,634,976, Jan. 6, 1987].

It is well known that in the measurement of magnetic Barkhausen noise it is not necessary for the measuring head to contact directly the material under testing, the results of the measurement can be corrected measuring the distance between measuring head and the material, and in the case of air gaps of a particular thickness results can be obtained, which are independent of the size of the air gap [METALELKTRO Kft: STRESSTEST 20.04 User Guide, 1995].

Figure 3:
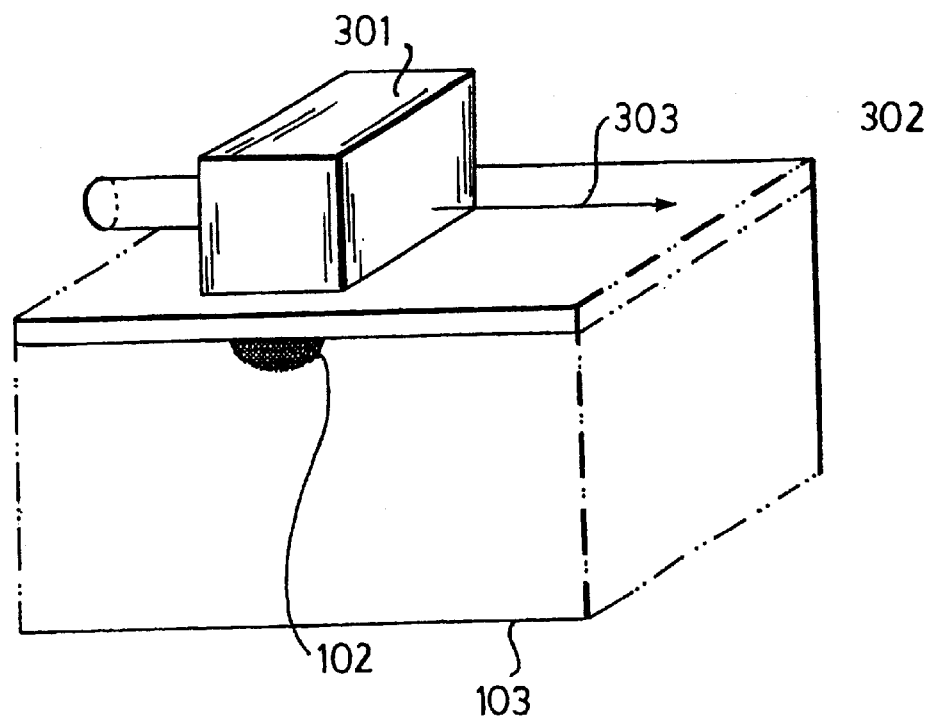
FIG. 3 shows a possible measuring arrangement for reading markings in motion, on a painted surface component through the measurement of Barkhausen noise

Hence, the markings, subject of the present application, made with laser surface treatment, can be read with a magnetic Barkhausen noise measuring head without contact. (FIG. 3).

The measurement can be carried out with a—Barkhausen—noise measuring head applied directly or 302 through an air gap or paint layer to the object 302, containing the information carried by the marking 304. The measuring head 301 can be displaced with in the direction of the arrow 303 relative to the marking 304, in case of bar markings, at a cross direction to the bars.

Measurement of Magnetic Barkhausen Noise

There are available instruments in the market to measure magnetic Barkhausen noise (e.g. STRESSCAN type from the American AST company or STRESSTEST type form the Hungarian company METALELEKTRO).

The principle of the measurement is that applying an energizing field of sinusoidal shape alternating at a frequency of 10 . . . 100 Hz periodically reverses the magnetic polarity of the material causing emission of a high frequency electromagnetic response signal. The response signal is generally detected by a measuring coil typically in a frequency band alternating from a few 100 Hz up to a few 100 kHz.

The construction of the device suitable for the measurement of Barkhausen noise can be found in a previous patent (WO 96/35974).

Structure of a Detector Suitable for the Task

The flux conducting iron core 402 is open in the direction of the base material 103 to be examined. Part of the flux lines leaving the flux conductor close through the test material. The surface of the test material where the flux lines pass the material are called the field of vision of the detector. The size of the vision field is proportional to the width of the flux conductor, the width of the gap in the flux conductor, respectively, and depends on the distance of the probe from the test material and the magnetic properties of the flux conductor and test material.

Figure 4:
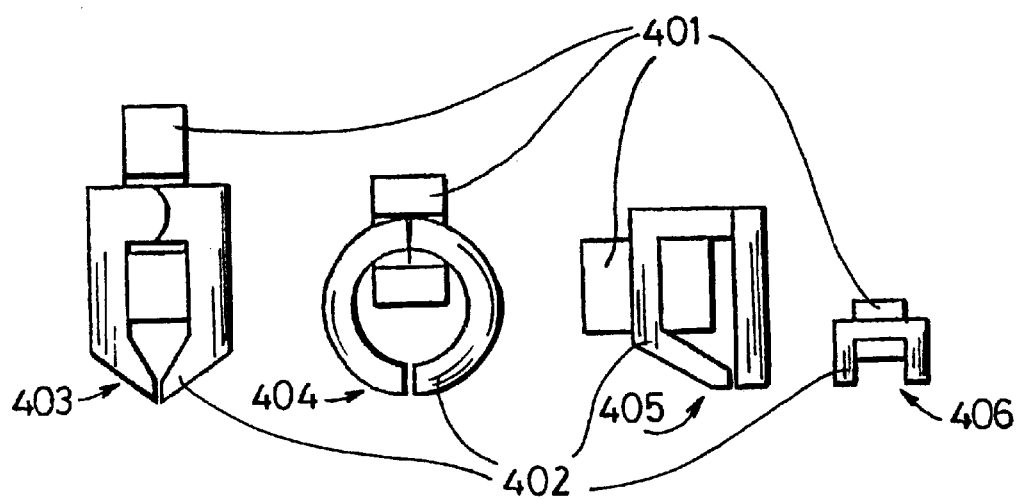
FIG. 4 shows a possible arrangement of induction probes for detecting flux (e.g for the measurement of magnetic Barkhausen noise).

FIG. 4 shows different probe structures: the probes consist of the coils 401 located on iron cores 402, the possible variants therefor are the following: 403—probe with a tape recorder head ferrite core, 404—probe with slit ring ferrite core, 405—probe with the half of a tape recorder head ferrite core, 406—probe with U shaped ferrite core. The material of the iron core is soft magnetic ferrite, high frequency, low Barkhausen noise material, for instance iron-dust-core or nano-crystalline material.

The accuracy of determining the distribution of magnetic Barkhausen noise measured at the annealed individual markings versus place and magnitude depends on the relation of the characteristic dimension of the detector's field of vision to the characteristic dimension of the markings, that is, to the characteristic place distribution of the magnetic Barkhausen noise measured on the markings. Characteristic dimensions of the detector's field of visions can not be reduced beyond all limits, because the sight distance of the detector, that is, the thickness of the air gap by which the detector still sees the material is in the same order of magnitude as the smaller field of vision.

The typical dimension of the gap used in the flux conductor iron core 402 is a few tenths of mm; the width of the iron core is a few mm.

Choosing the Direction of Energizing

The direction of energizing is selected on the basis of the patent WO 96/35497 with the difference, that it is characteristic of the stress state formed around the bar prepared with laser annealing, that the main stresses are aligned with the two geometric directions of the bar. Thus, it is practical to choose the direction of energizing in parallel to the annealed strip.

Optimization of the Level of Energizing

The optimizing of the level of energizing is done in accordance with the patent WO 96/35947 with the difference, that the optimal level of energizing for a given material will be the energizing level obtained by averaging the results measured on several prescribed points of the material, both on the base material and the annealed strip

Scan Speed

The limit of the scan speed for the known Barkhausen noise measuring heads is determined by the frequency of magnetic reversal [3].

Measuring Arrangement for Reading the Place and Magnitude of the Changes in Material Structure and Near Surface Internal Stress in Magnetizable Material in a Contactless Manner with Stray Flux Measurement It is well known that the relative permeability and magnetizing curve of the strip treated with laser beam and of the base material texture are different.

It is known furthermore that the flux distribution on the border of the laser treated strip resulting from the magnetic bias and/or residual magnetization can be detected and localized with a magnetic probe. Such probe can operate on the basis of magnetic induction (coil), Hall effect, magnetic resistance change, core resonance.

Reading of Markings with the Measurement of Stray Flux Based on the Principle of Magnetic Induction It is well known that the change of the magnetic flux with time induces voltage in the surrounding coil. The magnitude of the voltage is directly proportional with the speed of the flux change and the number of turns in the coil.

The induction coil with an iron core is more suited to detect stray flux; the shape of the iron core and the width of the air gap determine the detecting surface.

While detecting induction the required change of flux with time can be ensured by moving the coil or the volume to be measured in a circular way, continues straight line motion or with a magnetic field alternating continuously with time.

Figure 9:
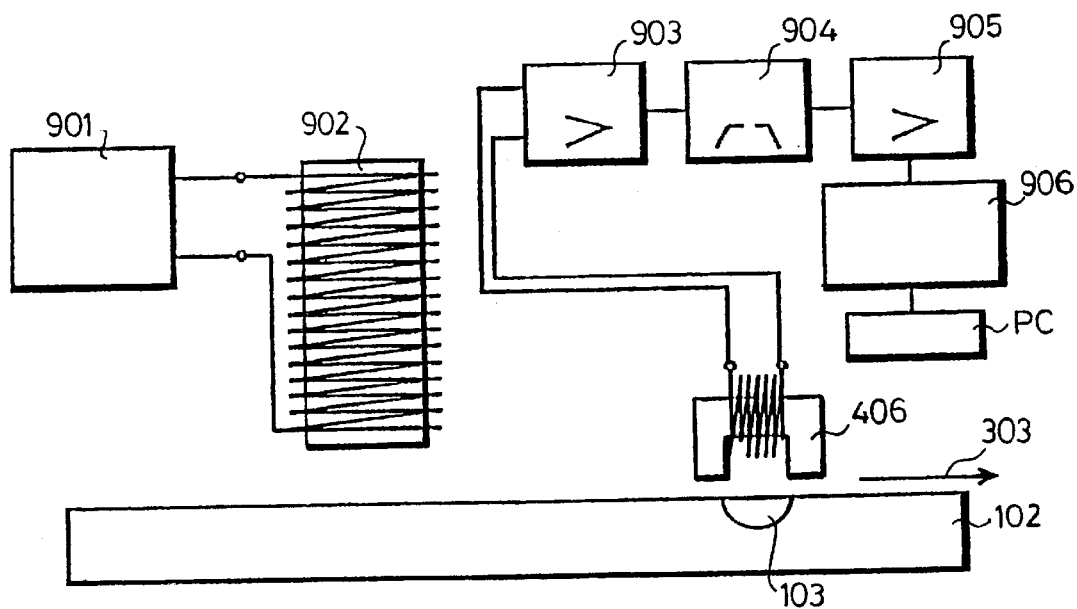
FIG. 9 shows a block diagram for stray flux measurement

The scheme of a possible measuring arrangement can be seen on FIG. 9.

The magnetization of the sample 103 is done by way of an iron core solenoid 902 which can be energized with direct or alternating voltage, connected to the energizing unit 901, but a magnet can also be used in place of the solenoid. The signal is detected during the relative displacement along arrow 303, with an open iron core probe 406.

The received signal 102 is passed through a series of amplifiers 903, 905 having suitably selected parameters, and filters 904 then digitized with an A/D unit 906, the digital values are then collected and evaluated by a PC connected thereto.

Producing an Induced Signal in the Probe

The energizing coil 902 responsible for the magnetization is situated at a constant distance 1003 from the probe 406 during the measurement. Thus, a constant induced voltage is produced in the probe in the homogenous, relatively stationary magnetic field. The relative movement of a sample 303, being relatively homogenous and isotopic from a magnetic aspect, in front of the probe induces constant voltage in the probe 406, because all points of the base material 103 are magnetized and demagnetized identically, and due to the homogeneity no variation in the flux distribution 1101 occur.

The sample with inhomogeneous magnetic (or electric) properties as annealed strip and base material affects the magnetic field (flux 1101). The changing magnetic field thus created will produce induced voltage in the probe 406.

The signal induced in the probe 406 will also include the effect of the flux change 1101 produced at the boundary of the two materials of different properties in the volume of the material having different magnetic properties.

The parameters affecting the detected signal can be optimized with a series of measurements corresponding to the given task. This is demonstrated in FIG. 10, where the reference signs are the following: 103—base material, 102—marking, 1004—width of the marking, 1006—width of the air gap of probe 406, 1005—distance of the probe from the surface of the base material 103, 1002—distance of the energizing coil 902 from the surface of the base material 103, 1007—strength of the energizing current, 1003—distance of the energizing coil 902 from the probe 406, 303—speed of relative displacement.

The voltage induced in the probe depends on the base material, the laser annealed strip, the width of the laser annealed strip (1004), the width of the probe's air gap (1006), the distance of the probe from the surface of the sample (1005), the distance of the energizing coil from the sub of the sample (1002), the strength of the energizing current (1007), the distance of the energizing coil from the probe (1003), the magnitude of the relative speed (303). With these settings the obtained signal/noise ratio was seven.

Figure 11:
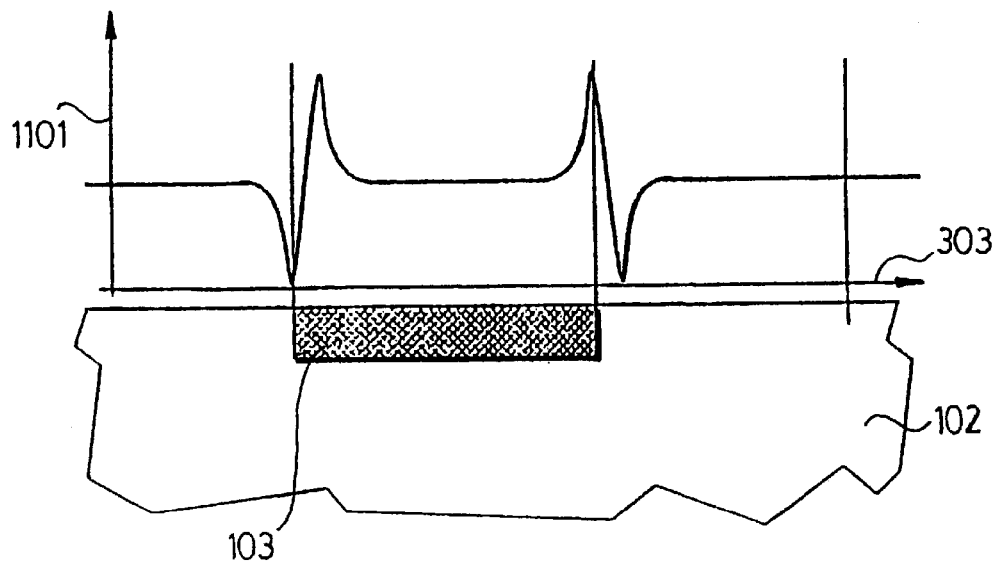
FIG. 11 shows a schematic diagram of the magnitude of the voltage induced in the probe of the measuring arrangement shown in FIG. 9 caused by the flux density forming on the marking.
Figure 12:
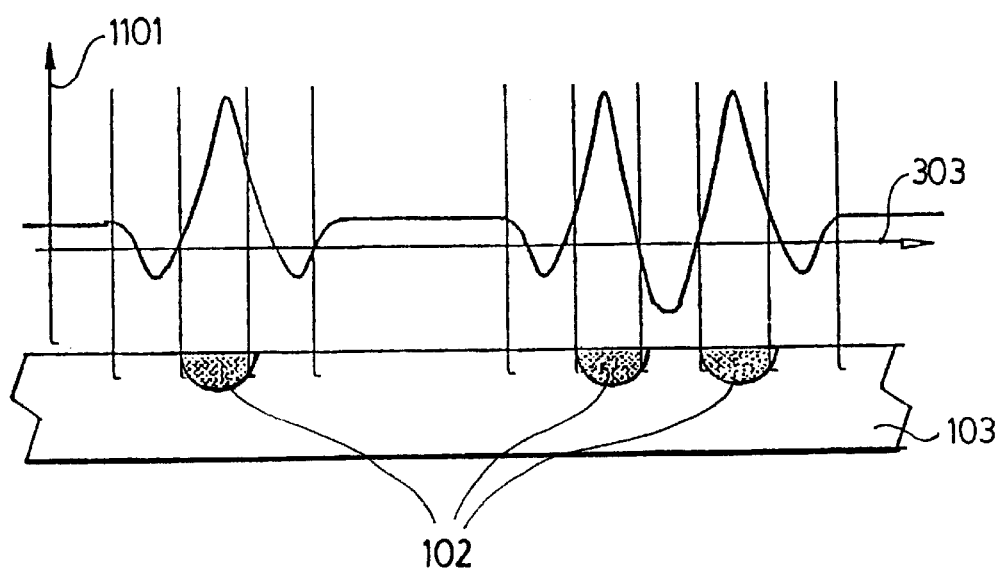
FIG. 12 shows the magnitude of the voltage induced in the probe of the measuring arrangement shown in FIG. 9 by three markings at different distances, if the width of the probe's air gap is commensurable with the width of the marking.

The curve in FIG. 11 can be measured with the parameters listed above, where the width of the strip having different properties is bigger by one order of magnitude than the field of vision of the detector, if the detector's field of vision is commensurable with the width of the strip, the signal form in FIG. 12 is produced on one or two strips.

A Few Characteristic Applications of the Invention
1. For the—Invisible—Marking of Car Serial Numbers and the Fast, Non-destructive Reading of the Markings.

Up to now the serial numbers of cars (motor number, chassis number, etc.) were usually applied mechanically by the manufacturers, e.g.: by stamping, the riveting of separate number plates, occasionally by painting, and recently readable numbers applied by laser, or the preparation series of laser bores as markings at hidden places, which are difficult to access. These methods are characterized basically by the possibility of visual reading. Some manufacturers have introduced electronic coding.

The experiences collected form car thefts show that these signs, markings can be easily re-written with a minimum cost, and the rewritten markings can be visually confused with the original (although there are methods to verify originality).

Other methods that can be used for marking, e.g.: glued bar-codes are relatively easy to replace, magnetic markings can be damaged in strong magnetic field, can be lost, or in some cases can be re-written.

The method according to the invention is more reliable than other known methods. The marking system uses suitable modification of the material structure or internal stress to produce and store the information, thus the markings are not necessarily readable by visual methods, but there are materials, where they can be visible, e.g. because of local change of color. The markings can be read in a non-destructive manner, as the reading head can sense the contents of the markings with an air gap even from under a coat of paint. In such cases however, the location of the markings should be known in order to keep measurement time at reasonable level.

The marking of the serial number consists in a bar code marking (marking group) prepared by laser beam, applied to an arbitrary selected conventional place (or even to all components of the chassis) during manufacturing. This bar code is not necessarily visible to the naked eye. The depth of the markings (bars) produced by laser beam technology is selected for practical purposes—generally—around a few tenths of mm. The application of these markings is not more expensive than traditional (e.g. number stamping) application, and does not pose problems within sophisticated manufacturing environments, as laser marking technology can easily be inserted into the production line and offers further advantages in quality control as well. With the aid of these markings it is possible to carry interim production information (all components can aid CIM—Computer Integrated Manufacturing system by chassis number and component number markings being captured by computer), hence the effectiveness of manufacturing management can be enhanced at the same time.

From the numbers of the chassis parts manufactured by cold stamping, parts list can be compiled and stored for each car, and subsequent replacement of the parts can be monitored both at the buyer and at the sales. This system could be a basis for assembly management as well.

To prepare the markings in the case of deep drawing steel sheet of 0.1% C contents (rolled, corrosion resistant) it is recommended that a nearly $TEM_{00}$ modus structure $CO_2$ laser be set at 2–3 mm defocus (the focus spot will fall inside the material), that is, choosing the diameter of the irradiated spot with P=300–400 W power and with a scan speed of about 33–50 mm/sec. By decreasing the scan speed, increasing the power of the laser, the absorption capacity of the material, respectively, the depth of the modified structure will increase, while there is the danger of melting the surface layer. Reducing the diameter of the focus spot while retaining the power at the same level will have the same effect on the structural change, while the reduction of the focus diameter will also reduce the probable depth of the treatment.

The device used could be a semiconductor laser or other device radiating concentrated light.

The markings are produced as a result of the local "annealing" by the easily controllable laser beam, causing local (texture) structure or internal residual stress changes in a strip width of about 1 mm and at a depth of a few tenths of mm (0.4–0.5 mm), which is easily readable with non-destructive methods. The reading device is suitable for reading the marking information below painted or corroded surfaces in scan mode, generally with a small air gap.

The reading of the markings can be carried out with a relatively simple device, e.g.: with a small air gap magnetic Barkhausen noise reader, or stray flux turning detector measurement in scan mode. Scanning—even by manual movement—can be carried out with a magnetic Barkhausen noise or stray flux reading head supported by a light, displaceable carriage. The use of the device is simple, allowing fist and reliable examinations in public road, at border crossing points. The reading device is easy to operate and can be produced in a mobile fashion with relatively little expense.

Example: based on the principle of magnetic Barkhausen noise measurement, with the following parameters:

| | |
|---|---|
| base material: | 0.1% C steel |
| texture of annealed strip: | 20% volume rate martensitic |
| width of annealed strip: | 1004 = 0.8 mm |
| energizing: | 1 kHz sinusoidal |
| magnetic field strength: | 0.4 kA/m |
| probe's number of turns: | 300 |
| signal filtering: | 32 kHz - 250 kHz |
| signal amplification: | $10^4$ |
| A/D conversion: | 12 bit |
| speed of the measuring head: | 0.005 m/s |
| signal/noise ratio: | 6.5 |

Figure 10:
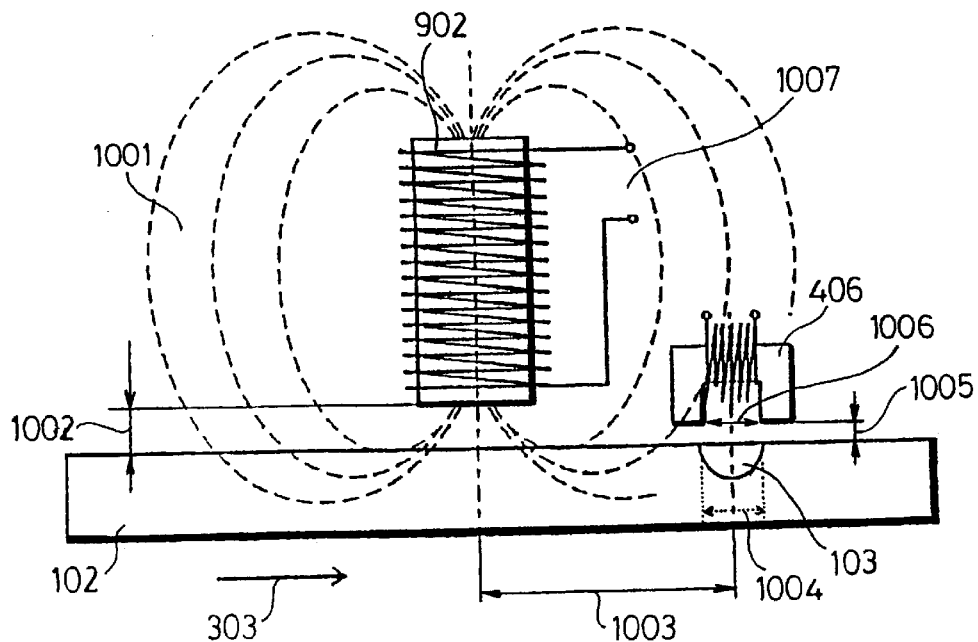
FIG. 10 shows a scheme of the characteristic measuring parameters of stray flux measurement.

Example: based on the principle of stray flux measurement the set parameters corresponding to the signs in FIG. 10.

| | |
|---|---|
| base material: | 0.1% C steel |
| texture of annealed strip: | 20% volume rate martensitic |
| width of the probes air gap: | 1006 = 0.4 mm |
| distance of the probe from the surface of the sample: | 1005 = 0.8 mm |
| distance of energizing coil from the surface of the sample: | 1002 = 8.0 mm |
| strength of energizing current: | 1007 = 0.35 A (0.2 kA/m) |
| distance of energizing coil from the probe: | 1003 = 7 mm |
| magnitude of relative speed: | 303 = 20 m/s |
| signal/noise ratio: | 5.0 |

In the manufacturing line the markings can be applied separately to all parts that can be (should be) marked, e.g. chassis, passenger area, package area, engine bonnet, doors, etc.). With this method its is possible to realize not only marking, but also quality certification, since the different parts of the car can be assigned to each other. Since in order to eliminate (delete or overwrite) the markings it is necessary the increase the temperature of the structure over the transformation temperature, and in the case of the usual car body and chassis materials this means heating to several hundred ° C., and this is practically impossible without damaging the paint or upholstery. Hence, the replacement of the information contents at a later time can not be carried out with simple methods even in the case of the traditional materials.

The overwriting of the information with sophisticated laser technology in the case of the assembled, finished car is costly, awkward and can be later discovered (e.g.: in case of a crime) partly because of the changes in the finish, partly from the depth shape of the markings, since the use of lasers have characteristics depending on the type and time in use. Thus, while the marking hardly increase the expenses in the manufacturing line, the cost of a subsequent change is significant and so, almost senseless.

The markings are time resistant, because for modifying the markings it is necessary to increase the temperature of the structure—the volume incorporating the marking—to temperatures above the transformation temperature.

The Elements of the System laser marking device(-es) for applying the markings (inserted into the technologic manufacturing line of all components to be marked), selection of an agreed upon position for the marking, selection of technologic data for the marking corresponding to components a coding system corresponding to the contents of the marking, magnetic Barkhausen noise or stray flux reading head (-s) to decode the markings placed at each decoding place, for the purpose of manufacturing management or verification of the markings)

the head must be aligned to the agreed upon position of the markings, with scanning motion and deciphering the coded signals.

The Advantages of Introducing the Method

The manufacturers could be interested in the introduction of a more reliable, anti-theft marking, because this may represent market advantages, that is, a more reliable marking can allow an increase of prices in comparison with the competition.

The insurance companies would reduce their risks insuring cars with markings that can not be overwritten easily.

If the manufacturer would use the described marking system, this would represent a new possibility in the identification of the parts of second-hand cars.

2. Use of the Method for the Measurement of the Deformation, or in Case of Limited Deformation, the Resulting Residual Stress of Steel Structures (Bridges, Railway Track Rails, Building Structure, etc.)

The method, subject matter of the invention, can be especially advantageously used for the control of the dimension changes of structures caused by mechanic stress and/or temperature changes, since the marking is incorporated into the material. The actual distance at any time between the markings applied in a stress free state, at known temperatures, at known spacing changes to the effect of mechanic stress and/or temperature changes. If two types of changes occur simultaneously, the mechanic stress can be calculated in the function of the actually measured distance and temperature taking into consideration the coefficient of thermal expansion and coefficient of elasticity.

For the Measurement of the Neutral Temperature or Railway Tracks

In welded tracks the sleeper prevents the displacement of the rails through the track fastening elements. After the rails have been clamped, any temperature changes cause stress in the rails due to restriction of dilatation. This stress is called thermal stress. The temperature in which the thermal stress in the tested cross-section of the rail is zero is termed neutral temperature. If a pair of markings can be applied to the rail it known temperature and known thermal stress state of the rail, and the distance between the markings can subsequently be measured with sufficient accuracy, it will be possible subsequently to determine the thermal stress, that is, the neutral temperature of that rail piece at all times.

The thermal stress produced in the rails built into welded railway tracks caused by the restricted dilatation can be determined from measured distance of the markings, the known measuring temperature, the base distance and the corresponding temperature, respectively. The neutral temperature than can be calculated from the thermal stress.

The measuring procedure comprises:

production of markings at known distance and known temperatures on the stress free rail or with the known stress state of the rail, measurement of the distance of the markings at known temperatures on the operating rail.

In the current practice, the markings are base points pasted, bored or stamped onto the rail, and the reading of their distance is performed generally by mechanic measurement, manually.

The basis of the new measuring method, is the production of time resistant markings through structural changes in suitable places of the rail, and the measurement of their position, distance without direct contact, more accurately than at present.

The markings can be produced, on the basis of the present knowledge, with laser surface treatment.

It is practical to produce not one mark, but a group of markings, the position of which should be linked to the manufacturing markings on the rail, to facilitate visual localization.

The marking consists of parallel bars of a few mm made by laser beam.

Example: To prepare markings by way of laser annealing in 0.45–0.6% C contents steel, the use of $TEM_{00}$ modus structure, $CO_2$ laser set to 3–6 mm defocus (the focus spot is outside over the material), with P=300–400 W power is recommended, by a minimum scan speed of 200–300 mm/min.

By decreasing the scan speed, increasing the power of the laser, the absorption capacity of the material, the depth of the modified structure will increase, while there is the danger of melting the surface layer. Reducing the diameter of the focus spot while retaining the power at the same level will have the same effect on the structural change, while the reduction of the focus diameter will also reduce the probable depth of the treatment.

The laser beam treatment modifies the texture at the place of treatment, and this can be localized e.g.: on the basis of Barkhausen noise measurement, from place dependent change of the value. The distance of the marks from each other is predetermined, and optimized in accordance with the reading head and other requirements. The number of marks (bars) should be more than two to increase the accuracy of determining the place of reading. The simplest is to produce the markings equidistantly. The marking group designates a geometric location along the rail that can be determined. E.g. the symmetry axis of a marking group of three marks can be a basis line for determining length. This geometric place could be for practical purposes the initial point, the end point, the middle, etc. of the marking group.

Carrying out reading of the marks based on the principle of magnetic Barkchausen noise measurement, it is advantageous to produce, and read the signals with the following parameters:

| | |
|---|---|
| base material: | 0.5% C steel |
| texture of annealed strip: | 50% volume rate martensitic |
| width of annealed strip: | 1004 = 1.0 mm |
| energizing at reading: | 1 kHz sinusoidal |
| magnetic field strength: | 1.0 kA/m |
| probe's number of turns: | 300 |
| signal filtering: | 32 kHz - 250 kHz |
| signal gain: | $10^5$ |
| A/D conversion: | 12 bit |
| speed of the measuring head: | 0.005 m/s |
| signal/noise ratio: | 7.5 |

If the reading of the markings is based on the principle of stray flux measurement the markings can be produced and read advantageously with the following parameters (parameters set in accordance with to the signs in FIG. 10.)

| | |
|---|---|
| base material: | 0.5% C steel |
| texture of annealed strip: | 50% volume rate martensitic |
| width of annealed strip: | 1004 = 1.0 mm |
| width of air gap in the probes: | 1006 = 0.4 mm |
| distance of the probe from the surface of the sample: | 1005 = 0.8 mm |
| distance of the energizing coil from the surface of the sample: | 1002 = 10.0 mm |
| strength of the energizing current: | 1007 = 1.0 A (0.6 kA/m) |
| distance of the energizing coil from the probe: | 1003 = 10.0 mm |
| magnitude of the relative speed: | 303 = 15 m/s |
| signal/noise ratio: | 7.0 |

The marking sets must be placed at the normal distance, in the knowledge of the temperature of marking, and for rails welded into the track, knowing, or calculating the neutral temperature of the rail section between the two markings.

Prescribed rail temperature is the temperature (e.g. 20° C.), at which the distance of the marking groups at stress free state is constant (e.g.: 870 mm). This distance is termed prescribed distance.

Corrected distance is the distance between marking sets at which the marking sets belonging together must be produced it if the rail temperature at marking, or in case of rails built into the track, the neutral temperature deviates from the prescribed temperature. The corrected distance can be calculated in the case of free standing rails, from the rail temperature at marking, in the case of rails built into the track, from the neutral temperature and the thermal dilatation coefficient of the rail's material.

The shape of cross-section of the local material structure induced by the laser perpendicular to the direction of the bars should be a half circle (FIG. 1.), being as deep as possible (e.g.: 0.5 mm) because of the corrosion, thus ensuring the possibility of reading for a long time.

The place of the marking groups should be chosen on the rail so as to minimize the effects of bending, curving, and to allow the marking groups to be read both by manual measuring device and by measuring device mounted on a cart. For this purpose for instance, both side surfaces of the head of the rail are suitable, below the level of the contact point with the wheel. FIG. 6 shows a possible arrangement for the measurement of distance in railway track rail 601. The 201 markings are located on both sides of the rail along the lower edge of the head. The distance of the marking groups 602 is the distance between characteristic points (e.g. median) of marking groups belonging together.

The effect of the length changes resulting from the bending of the rail can be corrected by measuring marking groups made at both sides of the rail.

Positions of the markings can be determined with a contactless method. A number of technical solutions can be implemented for measuring the distance of the markings with sufficient accuracy; both by manual and cart mounted versions.

Manual Reading

The device for manual reading comprises of two probes moving along a straight line, with the distance between the probes being known. In accordance with the technology used to produce the markings (the position of the marking group relative to the manufacturing markings) the manual measuring device is mounted, positioning it to the manufacturing marking. The measuring heads, moving along a straight line, measure the distribution of the magnetic properties, and form the distribution it is possible to determine the distance between some characteristic features of the distribution. Knowing this distance, the thermal dilatation coefficient of the rail's material, Young modulus and temperature, the neutral temperature can be determined.

Mobile or Scanned Reading

The mobile reading device mounted onto a carriage moving on the railway track rail comprises two measuring heads placed in a straight line which approach the marked surface of the rail. The distance of the heads is known.

The measuring heads, in the course of the movement of the carriage moving along a straight line read the distribution of the magnetic characteristics. Form the distribution it is possible to determine the distance between some characteristic features of the distribution. Knowing this distance, the thermal dilatation coefficient of the rail's material, Young modulus and temperature, the neutral temperature can be determined.

Assessment of the Accuracy of the Method

According to our present knowledge, taking into consideration all enumerated factors, the determination of the neutral temperature by manual measurement has an accuracy of 1–2° C., while in the case of mobile measurement—at a speed of not more than 15 m/s—the accuracy can be estimated at 2–3° C.

Markings can be produced in the new rails, so called long rails or in the rails to be built in at cuts, with set up equipment, or in rails built into tracks, with mobile equipment.

3. Invisible Marking of Bank Notes and Documents, and Fast and Non-destructive Reading of these Markings.

It is well known that so-called metal filament papers are used to produce bank notes, securities, etc. This is significant because production and distribution of metal filament papers are limited therefore falsification is difficult. The metal filament in the paper carries little information connected with the text printed on the paper (e.g.: the name of the bank of issue)

Through the use of the method, subject matter of the application, it is possible to produce a series of markings in the metal filament, which can be made to correlate with the text—e.g.: in the case of money with the denomination, series, serial number—printed on the paper.

Marking can be applied to the metal filament prior to its incorporation in the paper, but can be applied individually too, in accordance with the individual text on the paper.

The modification of the texture can be induced in the homogenous metal filament with local annealing. In the case of laser annealing for instance, for iron boron silicon glass metal the use of $TEM_{00}$ modus structure, $CO_2$ laser set to 3–6 mm defocus (the focus spot is over the material), with P=100 W power is recommended, by a minimum scan speed of 200–300 mm/min.

In the manufacturing of glass metal by changing the heat removal speed of the cooling drum with systematic geometry (0.5 mm wide crystalline bonds are suitable to form markings). In such case the glass metal ribbon contains identical mark, which will not be changed later by the technology utilized to insert them into the paper. Thus, the paper will not be damaged either by the energy input or the structural changes taking place in the metal.

The metal filaments in the finished paper should be marked in a manner not damaging the paper. To this end those materials are suitable, where the phase transformation can be induced at lower temperatures, without damaging the paper, in a way preventing the metal filament from absorbing the inputted energy. E.g. structural changes (structural relaxation, and crystallization) can be induced in the so called amorphous metals (metal glasses) or non crystalline metals at low temperatures, well below the flash point of the paper, and these structural changes are irreversible. The necessary energy can be input for instance with electron beam, which is fully absorbed in the metal filament (e.g. for Fe80B20 glass metal the density of the electron beam: 1200–1700 W/cm$^2$, radiation time: $10^0$–$10^2$ sec) allowing thus individual characters to be entered.

The information written into the metal filament can be read by measuring magnetic properties using one of the methods described above.

If reading of the markings is based on the principle of magnetic Barkhausen noise measurement, the markings can advantageously be produced and detected with the following parameters:

| | |
|---|---|
| base material: | Fe80B20 glass metal (amorphous) |
| annealed strip: | structural relaxation ≈ 220° C. |
| energizing: | 1 kHz sinusoidal |
| magnetic field strength: | 0.05 kA/m |
| probe's number of turns: | 300 |
| signal filtering: | 32 kHz - 250 kHz |
| signal gain: | $10^5$ |
| A/D conversion: | 12 bit |
| speed of measuring head: | 0.005 m/s |
| signal/noise ratio: | 5.5 |

If reading of the markings is based on the principle of stray flux measurement the markings can be produced and read advantageously with the following parameters (parameters set in accordance with to the signs in FIG. 10.)

| | |
|---|---|
| base material: | Fe80B20 glass metal (amorphous) |
| annealed strip: | structural relaxation " 200° C. |
| width of annealed strip: | 1004 = 0.4 mm |
| width of the air gap in the probes: | 1006 = 0.4 mm |
| distance of the probe from the surface of the sample: | 1005 = 0.5 mm |
| distance of the energizing coil from the surface of the sample: | 1002 = 5.0 mm |
| strength of energizing current: | 1007 = 0.05 A (0.06 kA/m) |
| distance of the energizing coil from the probe: | 1003 = 10.0 mm |
| magnitude of relative speed: | 303 = 10.0 m/s |
| signal/noise ratio: | 6.5 |

SUMMARY

The invention provides method and equipment system to enter and retrieve information into the surface layer of objects made of solid matter. According to the invention the information is entered with a beam directed to the surface (concentrated), having a power density selected to induce permanent change at least in the surface layer of the material's structure in a way, that the power density of the beam
- is smaller than the power density of the beam causing visible deformation,
- but exceeds that of the beam that causes (within the order of magnitude of the beam's diameter) inhomogeneity commensurable with the inherent structural inhomogeneity usually present in the material.

Figure 1:
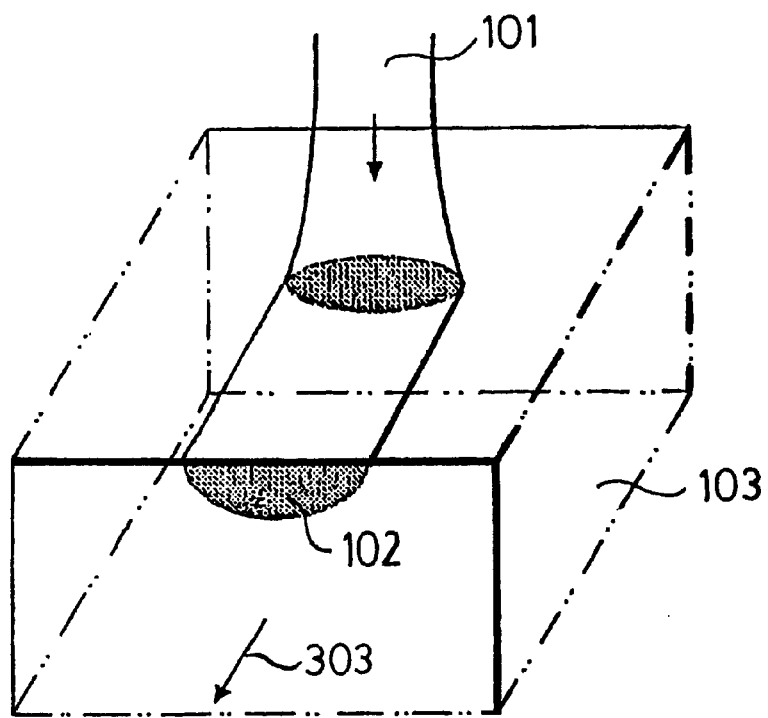
FIG. 1 shows the preparation of markings with laser beam, by moving a focused laser beam temperature changes occur at the surface of the workpiece which are sufficient to cause local structural changes (material structure, residual stress).

The invention can be used for all materials the structure or internal stress of which can be modified with high energy density surface treatment (at the location of the treatment) (preferably with the local laser treatment of ferromagnetic material) (FIG. 1.).

According to the invention, the marks or marking groups (on the surface treated with energy beam) comprise series of small spots, strips or their combination arranged to carry the required information, especially as barcode system—for the inscription of unique or serial numbers—, or marks or marking groups placed at given places, according to given dimensions to indicate geometric places (e.g.: points) or positions, especially for the purpose of measuring length (FIG. 2).
- the depth (and other) dimension of the markings or marking elements—from the surface towards the interior of the material—depend on the characteristics of the surface treatment which should be selected in accordance with the parameters of the marked structure and the information contents, so as to ensure durability and readability required by the intended use, even from under an optional coat, paint and small depth surface corrosion;

the markings and the marking system can be read with the aid of all methods suitable to detect the place and magnitude of structural changes of the materials, especially without direct contact and in a non-destructible manner (in a stationary or scan mode) through the measurement of magnetic and electric properties (FIG. 3);

the markings and the elements of the markings can only be deleted or overwritten at a later time following a treatment resulting in the transformation of type material's characteristic structure, or stress relaxation.

What is claimed is:

1. A system for the tracking of metallic objects by the application and subsequent reading and comparison of information incorporated therein with stored data, the system comprising a device for applying information to the object along a prescribed pattern, storing devices and a device for reading the information from the marked object, the device applying the information contains elements adapted to perform local heat energy transfer along the prescribed pattern for producing markings by permanently changing the surface layer of the object to be marked to a prescribed depth, the information reading device contains an energizing device adapted to energize the surface layer of the marked object and a detecting unit for detecting a response signal derived from the marked object by said energizing and an unit for restoring information from deviations caused by local unevenness of said response signal, characterized in that said energizing device (902) is adapted to energize the surface layer of the marked object (103) at least up to the depth of the marking and said detecting unit (406) is adapted for detecting a response signal invoked in said marked object (103).

2. The system as claimed in claim 1, characterized in that said marking device contains an energy beam producing unit, wherein energy density of said energy beam and size of the beam is sufficient to cause at least in the surface layer of the object to be marked a permanent change detectable inhomogenities present in the response signal invoked by said energizing as compared to the inhomogenities present in the response signal from the untreated state and restores the information from the detected inhomogenities.

3. The system as claimed in claim 1, characterized in that the marking device contains elements suitable for local heat removal from the surface of the object to be marked corresponding to the pattern of the marking.

4. The system as claimed in claim 3, characterized in that the heat removing element is incorporated in the part of the equipment processing the object that comes into contact with the surface of the object to be marked.

5. The system as claimed in claim 1, characterized in that the reading device comprises magnetic energizing unit, a detecting unit sensing response signal emitted by the marked object as a response to energizing and a unit restoring information carried by the marking from changes of the detected response signal.

6. The system as claimed in claim 5, characterized in that said detecting unit comprises a sensor unit detecting magnetic flux coming from the surface of the marked object.

7. The system claimed in claim 6, characterized in that said energizing unit produces an alternating flux and that a Barkhausen noise detecting unit is connected to said detecting unit.

8. The system claimed in claim 1, characterized in that said reading device contains an ultrasound generator adapted to be acoustically coupled to the marked object, and a unit for detecting response signal of the marked object, and a unit for restoring information carried by said marking from the inhomogeneities of the response signal.

9. The systems claimed in claim 1, characterized in that a device for adjusting distance is coupled to said marking device for applying more than one marking at predetermined distances from each other, said reading device is attached to a device measuring distance between markings.

10. The system claimed in claim 9, characterized in that said reading device contains at least two detecting units located at a distance corresponding to said predetermined spacing.

11. Any of the systems claimed in claim 1, characterized in that the metal object is attached to a non-metallic object.

12. The system claimed in claim 11, characterized in that the metallic object is incorporated into said non-metallic object to entry of information.

13. The system claimed in claim 11, characterized in that said metallic object is provided with a coating subsequent to entry of information.

14. The system as claimed in claim 2, characterized in that the reading device comprises magnetic energizing unit, a detecting unit sensing response signal emitted by the marked object as a response to energizing and a unit restoring information carried by the marking from changes of the detected response signal.

15. The system as claimed in claim 3, characterized in that the reading device comprises magnetic energizing unit, a detecting unit sensing response signal emitted by the marked object as a response to energizing and a unit restoring information carried by the marking from changes of the detected response signal.

16. The system as claimed in claim 4, characterized in that the reading device comprises magnetic energizing unit, a detecting unit sensing response signal emitted by the marked object as a response to energizing and a unit restoring information carried by the marking from changes of the detected response signal.

17. The system claimed in claim 2, characterized in that said reading device contains an ultrasound generator adapted to be acoustically coupled to the marked object, and a unit for detecting response signal of the marked object, and a unit for restoring information carried by said marking from the inhomogeneities of the response signal.

18. The system claimed in claim 3, characterized in that said reading device contains an ultrasound generator adapted to be acoustically coupled to the marked object, and a unit for detecting response signal of the marked object, and a unit for restoring information carried by said marking from the inhomogeneities of the response signal.

19. The system claimed in claim 4, characterized in that said reading device contains an ultrasound generator adapted to be acoustically coupled to the marked object, and a unit for detecting response signal of the marked object, and a unit for restoring information carried by said marking from the inhomogeneities of the response signal.

20. The systems claimed in claim 7, characterized in that a device for adjusting distance is coupled to said marking device for applying more than one marking at predetermined distances from each other, said reading device is attached to a device measuring distance between markings.

* * * * *